(12) United States Patent
Tsuchiya et al.

(10) Patent No.: US 7,965,350 B2
(45) Date of Patent: Jun. 21, 2011

(54) BACKLIGHT FOR LIQUID CRYSTAL DISPLAY DEVICE

(75) Inventors: Ryuji Tsuchiya, Ehime (JP); Hirozumi Nakamura, Ehime (JP); Naotada Okada, Tokyo (JP); Toshitake Kitagawa, Tokyo (JP)

(73) Assignees: Harison Toshiba Lighting Corporation, Imabari-shi, Ehime (JP); Kabushiki Kaisha Toshiba, Minato-ku, Tokyo (JP)

( * ) Notice: Subject to any disclaimer, the term of this patent is extended or adjusted under 35 U.S.C. 154(b) by 330 days.

(21) Appl. No.: 12/278,070

(22) PCT Filed: Jan. 31, 2007

(86) PCT No.: PCT/JP2007/051591
§ 371 (c)(1),
(2), (4) Date: Aug. 1, 2008

(87) PCT Pub. No.: WO2007/088886
PCT Pub. Date: Aug. 9, 2007

(65) Prior Publication Data
US 2009/0046220 A1    Feb. 19, 2009

(30) Foreign Application Priority Data
Feb. 1, 2006  (JP) .................................. 2006-024546

(51) Int. Cl.
G02F 1/1335    (2006.01)
(52) U.S. Cl. ....................................................... 349/65
(58) Field of Classification Search ....................... 349/65
See application file for complete search history.

(56) References Cited

U.S. PATENT DOCUMENTS

| 5,339,179 | A  | * | 8/1994  | Rudisill et al.  | 349/65  |
| 5,961,198 | A  | * | 10/1999 | Hira et al.      | 362/621 |
| 6,072,551 | A  | * | 6/2000  | Jannson et al.   | 349/64  |
| 6,099,134 | A  | * | 8/2000  | Taniguchi et al. | 362/618 |
| 6,256,447 | B1 | * | 7/2001  | Laine            | 385/146 |
| 6,612,722 | B2 | * | 9/2003  | Ryu et al.       | 362/331 |
| 6,700,634 | B2 | * | 3/2004  | Taniguchi et al. | 349/65  |

FOREIGN PATENT DOCUMENTS

| JP | 11-282388 A   | 10/1999 |
| JP | 2004-227934 A | 8/2004  |
| JP | 2004-253367 A | 9/2004  |
| JP | 2006-024439 A | 1/2006  |

OTHER PUBLICATIONS

International Search Report for PCT/JP2007/051591.
International Preliminary Report Application for PCT/JP2007/051591 dated Jan. 31, 2007.

* cited by examiner

*Primary Examiner* — James A Dudek
(74) *Attorney, Agent, or Firm* — Banner & Witcoff, Ltd.

(57) ABSTRACT

A backlight for a liquid crystal display device includes a plurality of point light sources 1 arranged linearly, a light guide plate 3 having a light incident surface 3a, a reflection surface 3b and a light emitting surface 3c for emitting the light reflected by the reflection surface 3b. A light scattering pattern 31 is formed on the reflection surface 3b. A light control pattern 32 is formed on the reflection surface 3b at almost entire portions except for the light scattering pattern 31 is formed for reflecting the light introduced and for outputting from the light emitting surface 3c. A pattern less area is formed on the reflection surface 3b at a boundary portion between the light scattering pattern 31 and the light control pattern 32.

3 Claims, 5 Drawing Sheets

BACKLIGHT FOR LIQUID CRYSTAL DISPLAY DEVICE

TECHNICAL FIELD

The present invention relates to a backlight for liquid crystal display device.

BACKGROUND ART

In recent years, a backlight for a liquid crystal display device equipped with a sidelight composed of numbers of arrayed LEDs is known. In the backlight for the liquid crystal display device, light from LEDs is introduced from an end surface of a light guide plate, scattered, diffused inside the light guide plate and is emitted from a light emitting surface toward a liquid crystal panel.

The backlight for a liquid crystal display device with a structure described, however, had a problem that bright and dark lines appear on the light emitting surface in the vicinity of the end surface of the light guide plate. The reasons are described below. First, it is difficult to suppress the bright lines because the LED is a point light source with strong directional characteristics and strong brightness. Second, it is also difficult to suppress the dark lines due to spaces between point light sources of LED elements, from which no light is emitted. Thus, unevenness in the light emitting surface such as the bright and dark lines are generated in the light guide plate near the sidelight owing to a great contrast difference in the sidelight provided by the numbers of LEDs.

As a measure for eliminating bright lines generated in the light emitting surface of the light guide plate of the backlight having such construction mentioned above, Japanese Unexamined Patent Application Publication No. 2002-175713 discloses a technique in which a plurality of holes are provided at a portion near the sidelight of the light guide plate and a light path is changed by the difference of refraction indexes between the light guide and inside the hole. Further, Japanese Unexamined Patent Application Publication No. 2004-213025 discloses a technique in which a light diffusion member is provided at a position where the light from a source is introduced into a light guide plate, to diffuse the light by a reflection surface before it enters into the light guide plate. However, any of these technologies could not fully eliminate the unevenness of bright and dark lines generated at a portion of light emitting plate near the point light source.

DISCLOSURE OF THE INVENTION

The present invention is made in view of such problems in the conventional arts, and it is therefore one of the objects of the present invention to provide a backlight for a liquid crystal display device capable of preventing the bright and dark lines from generating at a portion near the incidence surface of the light guide by applying a simple construction, and capable of providing a uniform and high brilliant light emission.

The backlight for a liquid crystal display device includes a plurality of point light sources arranged linearly, a light guide plate having a light incident surface for introducing light from the point light sources into the light guide plate, a reflection surface for reflecting the light introduced into the light guide plate and a light emitting surface for emitting the light reflected by the reflection surface, an optical sheet which controls the distribution of the light emitted from the light emitting surface of the light guide plate, a light scattering pattern which is formed on the reflection surface of the light guide plate at a portion near the light incidence surface for scattering the light introduced from the light emitting surface, a light control pattern which is formed in almost entire area except the light scattering pattern of the reflection surface of the light guide plate for reflecting the light introduced from the light incidence surface and for introducing it to the light emitting surface, and a pattern less area formed at a boundary portion between the light scattering pattern and the light control pattern on the reflection surface of the light guide plate.

In the backlight for a liquid crystal display device according to the present invention, the reflection surface is provided with numbers of concave portions of a cylindrical shape, conical shape, or truncated cone shape as a light scattering pattern.

In the backlight for a liquid crystal display device according to the present invention, the reflection surface is provided with moon-cut patterns as the light control pattern.

In the backlight for a liquid crystal display device according to the present invention, a front frame is provided on the periphery of the light emitting surface of the light guide plate, and the light scattering pattern and the pattern less area are provided at the end portion of the point light source side of the light emitting surface covered with the front frame.

In the backlight for a liquid crystal display device according to the present invention, the end portion to the opposite side of the point light source of the pattern less area coincides with the side edge portion of the light emitting surface of the front frame, or extending from there toward the light emitting surface side.

In the backlight for a liquid crystal display device according to the present invention, the point light source is formed by a LED.

In the backlight for a liquid crystal display device according to the present invention, the light scattering pattern is formed on the reflection surface of the light guide plate at a portion near the point light source, and the light control pattern is formed in almost entire area except for the boundary area between the light scattering pattern and the light control pattern where a pattern less area is formed with no light diffusion pattern formed. With the structure described, the liquid crystal display device can be lit with uniform brilliance without bright lines or dark lines in the light emitting surface, even when numbers of point light sources with strong directional characteristics are arranged as sidelight.

DETAILED DESCRIPTION OF THE INVENTION

Figure 1:
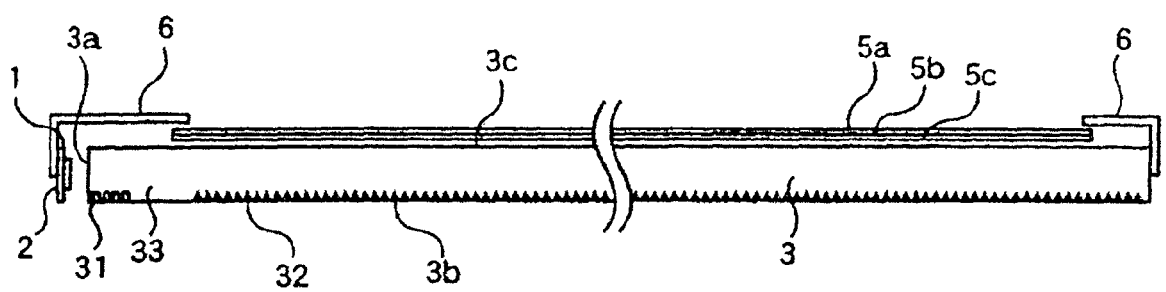
FIG. 1 is a cross section view of a backlight for liquid crystal display device according to an embodiment of the present invention.
Figure 2:
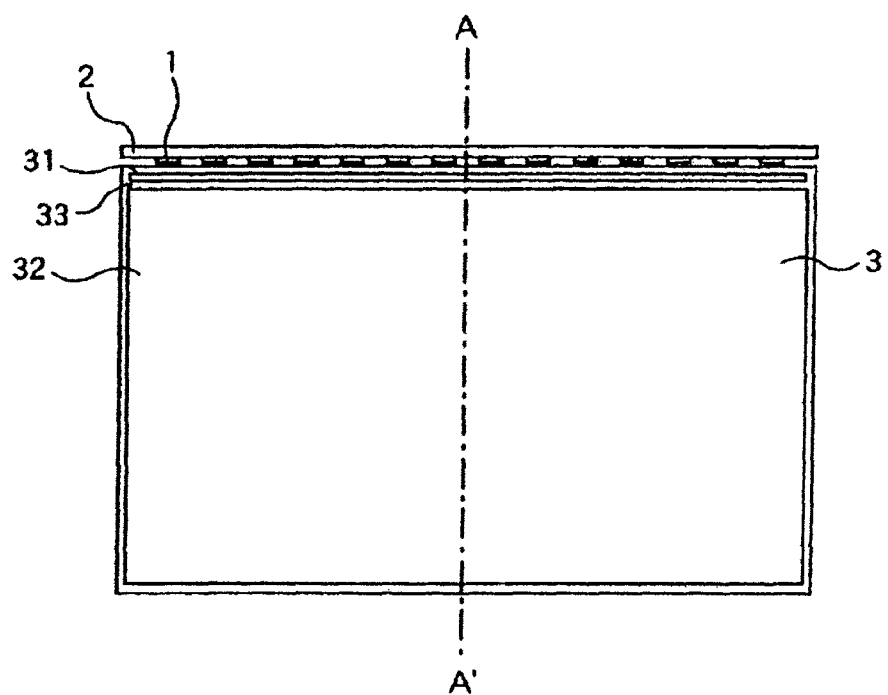
FIG. 2 is a plan view of the backlight for liquid crystal display device according to the embodiment shown in FIG. 1 while an optical sheet is removed.

Hereinafter, an embodiment of the present invention will be explained in detail referring to the figures. FIG. 1 is a cross section view of a backlight for a liquid crystal display device which is an embodiment of the present invention, and FIG. 2 is the plan view thereof. Here, in FIG. 2, an optical film and a frame are omitted for showing the construction of a light guide plate for better understanding. In the backlight for a liquid crystal display device of the embodiment, a plurality of point light sources 1, each composed of LED for example, is arranged linearly on a board 2 facing a light incident end surface 3a of a light guide plate 3. Here, a field emission element or a discharge lamp can be used as the point light source instead of LED. The plurality of point light sources 1 may be arranged on the wide side end surface of the light guide plate 3 as shown in the figure, or may be arranged on the narrow side end surface. Further, the point light sources 1 may be arranged on both of the wide side end surfaces, or may be arranged on both of the narrow side end surfaces.

The light guide plate 3 has a light incident surface 3a which is an end surface adjacent and facing to the point light source 1, a reflecting surface 3b which is a bottom side of the light guide plate 3, and a light emitting surface 3c which is an upper side of the light guide plate 3. Above the light emitting surface 3c of the light guide plate 3, optical films 5a, 5b, and 5c are arranged closely. Among the optical films 5a, 5b, and 5c, at least one film is provided. Two or more suitable numbers of the film are arranged according to the required light distribution characteristics. A front frame 6 is provided at a periphery of the light emitting surface 3c of the light guide plate 3, which defines the frame position of the liquid display device and fastens the optical film 5 to the light guide plate 3.

A light scattering pattern 31 and a light control pattern 32, which are light derivation patterns, are provided on the reflecting surface 3b of the light guide plate 3. More specifically, a narrow light scattering pattern 31 is formed along the array of the point light source 1 at its vicinity. A wide light control pattern 32 is formed on almost entire area of the reflecting surface 3b at a side away from the point light source 1. No pattern is formed at the boundary area between the light scattering pattern 31 and the light control pattern 32, which forms a pattern less area 33.

Figure 3A:
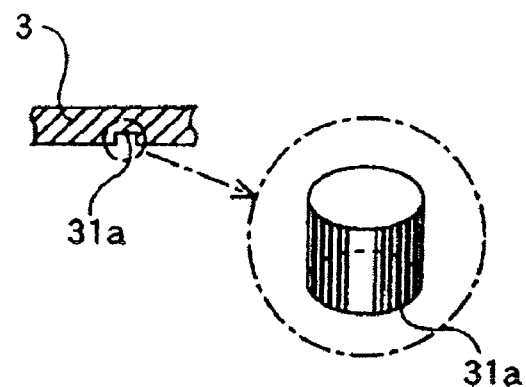
FIG. 3 is a schematic diagram for showing shape examples of a light scattering pattern to be formed on a reflecting surface of a light guide plate in the backlight for a liquid crystal display device according to the embodiment shown in FIG. 1.
Figure 3B:
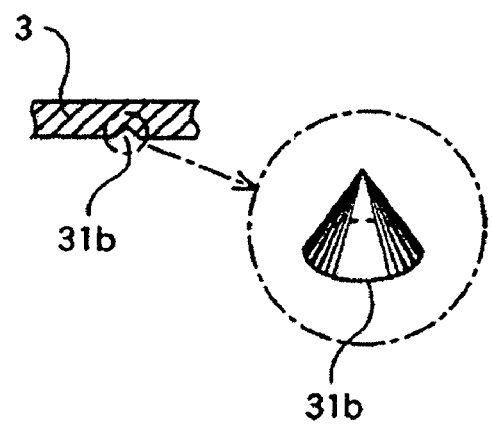
Figure 3C:
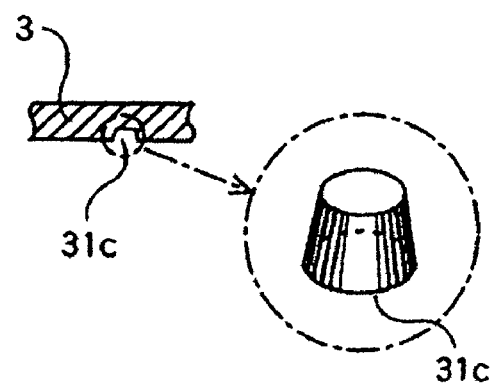

In the light scattering pattern 31 in the vicinity of the point light source 1, numbers of light scattering patterns as shown in FIG. 3 (a) to FIG. 3 (c) are arranged on the reflecting surface 3b of the light guide plate 3. More precisely, these light scattering patterns are formed by, for example, a cylindrical concave portion 31a, a conical shape concave portion 31b or a truncated cone shape concave portion 31c. The sizes of these light scattering patterns are as follows. In the case of the pattern of the cylindrical concave portion 31a, for example, the diameter of the cylindrical concave portion is about φ 0.2 mm and the depth is about 0.06 mm. It is formed using an embossing or other process. Any pattern of such light scattering pattern operates in the following way. The surface in the concave portions 31a to 31c facing the point light source 1 operates as a reflecting surface to scatter the light entered through the incident surface 3a into the light guide plate 3 to emit a part of the scattered light from the light emitting surface 3c.

Figure 4:
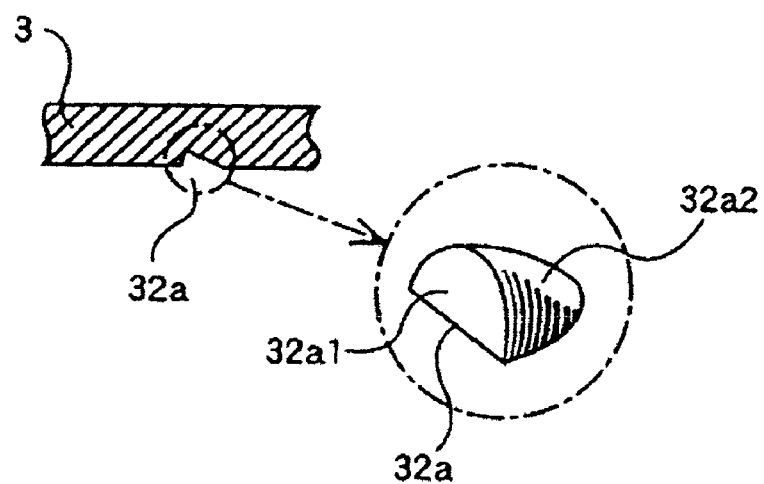
FIG. 4 is a schematic diagram for showing shape examples of a light controlling pattern to be formed on a reflecting surface of the light guide plate in the backlight for the liquid crystal display device according to the embodiment shown in FIG. 1.
Figure 5:
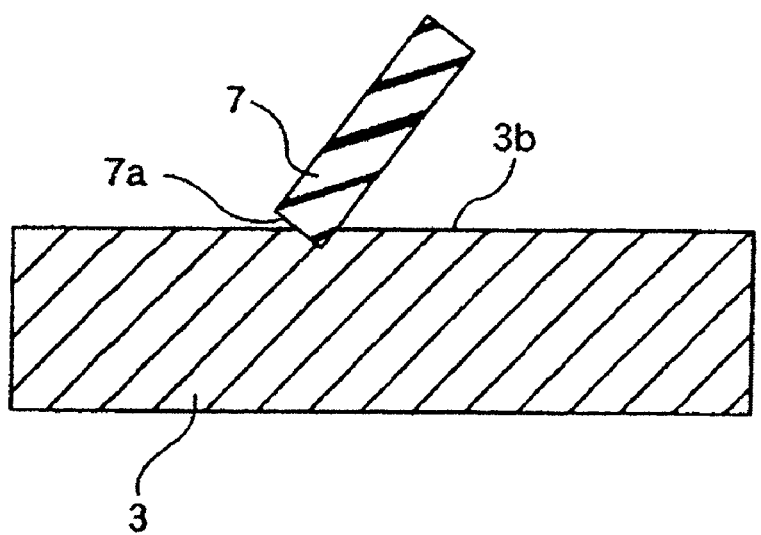
FIG. 5 is a cross section view for showing a manufacturing method of a moon-cut pattern in the light control pattern to be formed on a reflecting surface of the light guide plate in the backlight for the liquid crystal display device according to the embodiment shown in FIG. 1.

The light control pattern 32 of the light guide plate 3 is formed on the reflecting surface 3b of the light guide plate 3, for example, using the embossing or other process. The shape of the light control pattern 32 preferably has such shape as a moon-cut pattern 32a, so that the light advancing in the light guide plate 3 with total reflection can be reflected effectively as shown in FIG. 4. The moon-cut pattern 32a has a concave shape having a flat slope 32a1 facing the point light sources 1 and a curved surface 32a2 on the opposite side of the flat slope 32a1 as shown in FIG. 4. When the light propagated in the light guide plate reaches to the flat slope 32a1, the light path is turned to the light emitting surface of the light guide plate. The moon-cut pattern 32a can be formed quite easily, for example, in such a way as shown in FIG. 5. That is, an end mill 7 is put on the reflecting surface 3b of the light guide plate 3 so that a part of the top surface 7a of the end mill 7 does not contact with the reflecting surface 3b for being declined by a predetermined angle as if it is floated. The mill 7 is pushed to the reflecting surface 3b to mill the reflecting surface by rotation.

Here, the relations between the light scattering pattern 31, the light control pattern 32, pattern less area 33 and the front frame 6 areas follows. The light scattering pattern 31 and the pattern less area 33 are covered with the front frame 6 and are located outside the display screen of the liquid crystal display device. On the other hand, the light control pattern 32 is located in the display screen without being covered with the front frame 6.

The position and the width of the pattern less area 33 can be modified depending on the thickness or the frame size of the light guide plate 3. For example, it can be provided in an area from the outer edge periphery of the light emitting surface 3c by 1 mm to 3 mm. That is, when the thickness of the light guide plate 3 is 3.6 mm, and the width of the portion covered by the frame in the light guide plate 3 is 3.5 mm, the pattern less area 33 can be provided in an area shifted from the inner edge periphery of the frame toward the outer edge periphery of the light guide plate 3 by 0.5 to 2.5 mm.

Figure 6A:
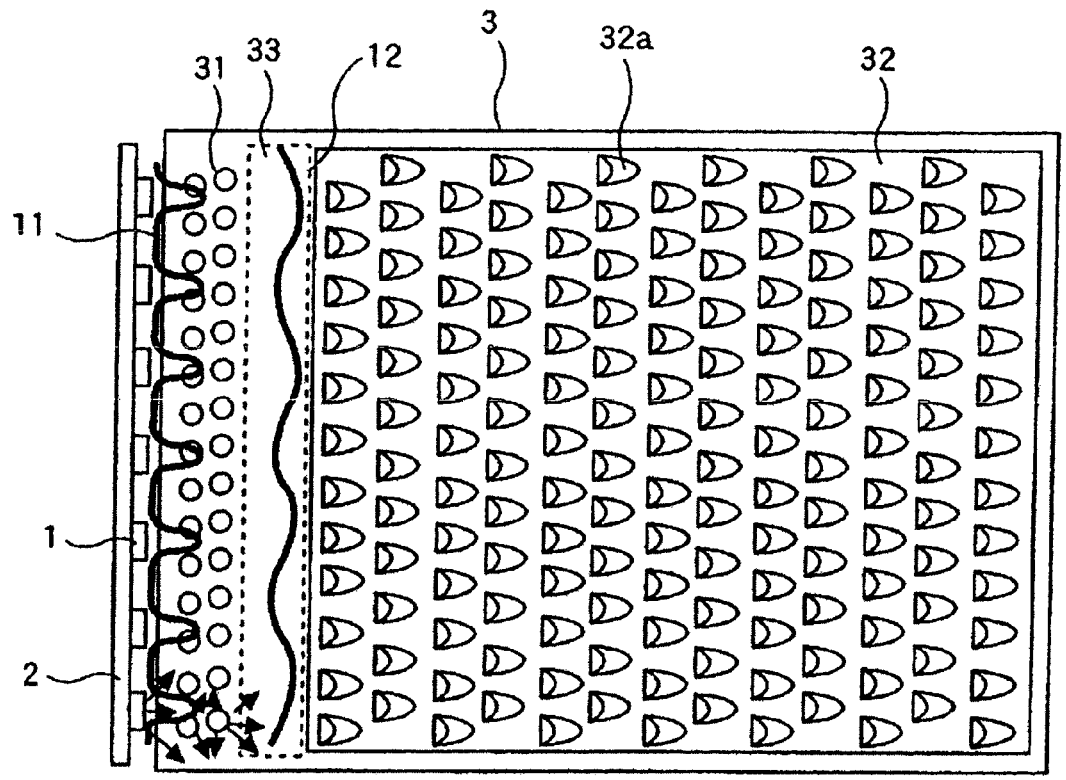
FIG. 6(a) is a plan view for explaining an operation of a backlight for the liquid crystal display device according to the embodiment of the present invention.
Figure 6B:
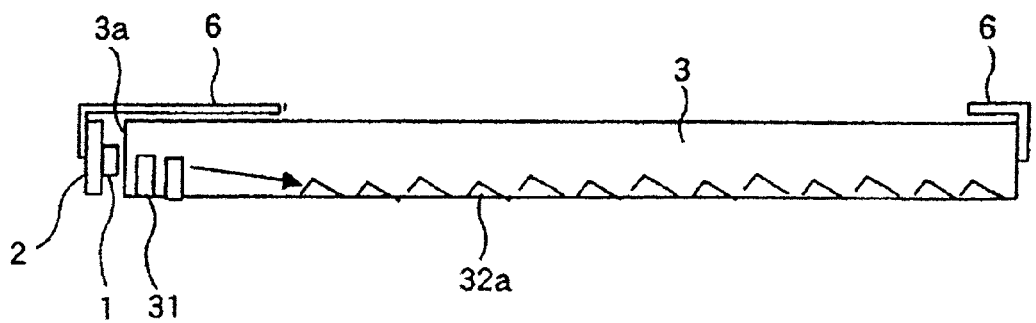
FIG. 6(b) is a side cross section view for explaining the operation of a backlight for the liquid crystal display device according to the embodiment of the present invention.
Figure 7A:
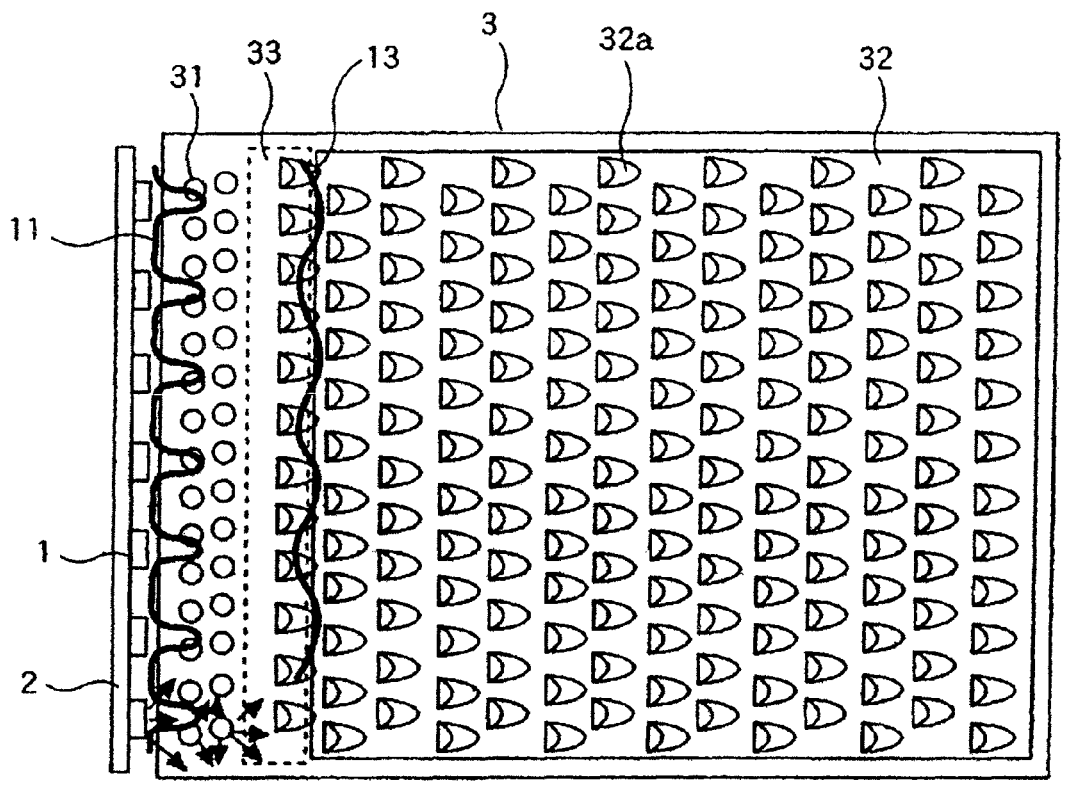
FIG. 7(a) is a plan view for explaining the operation of the backlight for a liquid crystal display device according to a comparative example of the present invention.
Figure 7B:
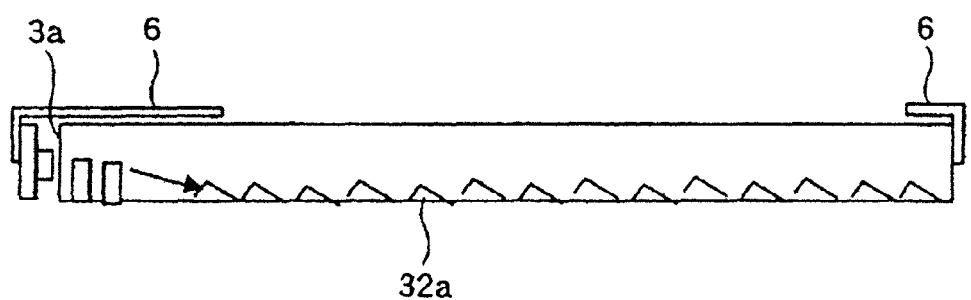
FIG. 7(b) is a side cross section view for explaining the operation of a backlight for a liquid crystal display device according to the comparative example of the present invention.

FIG. 6(a) is a plan view for explaining an operation of an embodiment according to the present invention and FIG. 6(b) is a side cross section view of the embodiment. FIG. 7(a) is a plan view for explaining an operation of a comparative example in order to explain the operation of the present invention and FIG. 7(b) is a side cross section of the comparative example. In these figures, the same symbols are assigned to the same parts or corresponding parts with FIG. 1 through FIG. 4. In these figures, the frame 6 shown in side cross section views FIG. 6(b) and FIG. 7(b) is eliminated in the plan views FIG. 6(a) and FIG. 7(a).

The curve 11 of the waveform shown in FIG. 6(a) indicates emission intensity of a plurality of LEDs composing the point light sources 1 arranged in a row. In more detail, the emission intensity curve 11 has a sharp peak at a portion right above the LED and the intensity curve 11 slowly goes down at the interval of the adjacent LEDs. The light radiated from LED enters into the light guide plate 3 from the light incident end surface 3a and advances to a direction away from the light incident end surface 3a in the light guide plate 3. The light reaches the light scattering pattern 31 and is scattered in this area. The scattering is made in such different directions as a direction across the light emitting surface 3c of the light guide plate 3 or various directions in the horizontal surface parallel to the light emitting surface 3c, though the directions are somewhat different depending on the shape of light scattering pattern. The sharp peak value in the emission intensity curve 11 due to the directional characteristics of individual LED is reduced by this scattering. The radiated light from LED which passed through the light scattering area 31 is introduced into pattern less area 33 of the light guide plate 3 and advances to the direction inside the light guide plate 3 apart from the light incident end surface 3a. In the pattern less area 33, the light scattered in the direction intersecting with the light emitting surface 3c is totally reflected at this area because the reflecting surface 3b and the light emitting surface 3c of the light guide plate 3 is flat. Thus, the peak value in the emission intensity curve 11 is further reduced to be a moderate emission intensity curve as shown by the waveform curve 12 of FIG. 6(a).

Next, the light radiated from LED is introduced into the light control pattern 32. In this area of pattern 32, a part of light advancing in the horizontal direction, which is in parallel with the light emitting surface 3c among the light advancing in the light guide plate 3, is reflected upward by the flat slope 32a1 of the moon-cut pattern 32a. When the spacing between LEDs is sufficiently narrow, and the emission intensity curve is moderate in both of the light diffusion pattern area and in pattern less area, the pattern 3 along the arrange direction of the LEDs may be the same pattern. On the other hand, when the spacing between LEDs is wide, and the emission intensity curve is not moderate in both of the light diffusion pattern area and in pattern less area, a moderate emission intensity curve can be obtained by modifying the pattern depth distribution and pattern density distribution along the arrange direction of the LEDs.

As the result, bright and dark lines caused by directional characteristics of the point light source such as a plurality of the LED1 are eliminated.

In the backlight for a liquid crystal display device of the comparative example shown in FIGS. 7(a) and 7(b), an end portion of the light control pattern 32 on LED side is located at a position partly covered by the front frame 6. As the result, a bright and dark stripe corresponding to the emission intensity curve due to the directional characteristics of the LED appears at the periphery of the display screen. The reason is that the light radiated from LED and advancing in the light guide plate 3 is refracted upward by a light control pattern 32a existing in a portion covered by the front frame 6 and is emitted from the light emitting surface 3c of the light guide plate 3.

As mentioned above, the backlight for a liquid crystal display device according to the present embodiment is provided with a number of point light sources 1 such as LEDs arranged in a row, and with the light guide plate 3 which introduces the light from the point light sources 1 to the incident surface 3a and emits from light emitting surface 3c. The light scattering pattern 31 is provided on the reflecting surface 3b of the light guide plate 3 at a portion near the point light source 1. On the area on the reflecting surface 3b other than the light scattering pattern 31 is formed, the light control pattern 32 is formed in almost entire area except a boundary area with the light scattering pattern 31. The pattern less area 33 in which light diffusion pattern is not formed is provided at a boundary area between the light scattering pattern 31 and the light control pattern 32. Owing to the structure described, the liquid crystal panel can be lit with uniform brightness without bright lines or luminescent spots in the light emitting surface even when the point light sources 1 with strong directional characteristics are used as sidelight.

Briefly, the pattern less area 33 which is provided in the boundary portion between the light scattering pattern 31 located near the point light source 1 and the light control pattern area 32 formed apart from the light scattering pattern 31, operates to prevent bright and dark lines from appearing because light diffusion behavior is different in the light scattering pattern 31 area and the light control pattern 32 area which are located on both sides of 33.

It is needless to say that the present invention is not limited to the embodiment described above. For example, the light scattering pattern 31 may be a reflection pattern like a V-shaped groove formed on the reflecting surface 3b of the light guide plate 3. Further, a moon-cut pattern formed in the light control pattern area 32 may be used for the light scattering pattern 31 in a similar manner. The reflecting surface 3b of the light guide plate 3 may be subject to a blast-finishing treatment or may be a scattered reflection plane by printing dot patterns. Finally, micro prisms may be arranged on the reflecting surface 3b of the light guide plate 3.

The invention claimed is:

1. A backlight for a liquid crystal display device comprising:
    a plurality of point light sources arranged linearly;
    a light guide plate having a light incident surface for introducing light from the point light sources into the light guide plate, a reflection surface for reflecting the light introduced into the light guide plate and a light emitting surface for emitting the light reflected by the reflection surface;
    an optical sheet for controlling light distribution of the light emitted from the light emitting surface of the light guide plate;
    a light scattering pattern formed on the reflection surface of the light guide plate at the vicinity of the light incident surface;
    a light control pattern formed on the reflection surface of the light guide plate at almost entire portions except for the light scattering pattern for reflecting the light introduced from the light incident surface to the light emitting surface;
    a pattern-less area formed on the reflection surface of the light guide plate at a boundary portion between the light scattering pattern and the light control pattern; and
    a front frame on the periphery of the light emitting surface of the light guide plate,
    wherein the reflection surface is provided with numbers of concave portions having a cylindrical shape, a conical shape, or a truncated cone shape to form a light scattering pattern,
    wherein the reflection surface is provided with moon-cut patterns to form the light control pattern, and
    wherein the light scattering pattern and the pattern less area are provided at the end portion on the point light source side of the light emitting surface and are covered with the front frame.

2. The backlight for a liquid crystal display device according to claim 1, the end portion on the opposite side to the point light source of the pattern-less area coincides with the edge on the side of the light emitting surface of the front frame, or is extended to the light emitting surface side.

3. The backlight for a liquid crystal display device according to claim 1, wherein the point light source is LED.

* * * * *